United States Patent [19]
Schaub et al.

[11] Patent Number: 5,431,458
[45] Date of Patent: Jul. 11, 1995

[54] NO-HUB COUPLING

[75] Inventors: Erwin Schaub; Antonio Pires, both of Jacksonville; James Stinson, St. Augustine, all of Fla.

[73] Assignee: Stant Corporation, Deerfield, Ill.

[21] Appl. No.: 227,136

[22] Filed: Apr. 13, 1994

[51] Int. Cl.$^6$ .............................................. F16L 21/06
[52] U.S. Cl. .................................... 285/236; 285/369; 285/328
[58] Field of Search ............... 285/369, 236, 328, 259, 285/252

[56] References Cited

U.S. PATENT DOCUMENTS

| | | | |
|---|---|---|---|
| 3,233,922 | 2/1966 | Evans | 285/236 |
| 3,359,017 | 12/1967 | Schaub | 285/236 |
| 3,402,946 | 9/1968 | Dedian | 285/236 |
| 3,558,164 | 1/1971 | Havell . | |
| 3,837,683 | 9/1974 | Taylor . | |
| 3,933,377 | 1/1976 | Arrowood | 285/236 |
| 4,101,151 | 7/1978 | Ferguson . | |
| 4,380,348 | 4/1983 | Swartz . | |
| 4,538,837 | 9/1985 | Cronk | 285/236 |
| 4,538,839 | 9/1985 | Ledgerwood | 285/236 |
| 4,564,220 | 1/1986 | Sills et al. | 285/236 |
| 4,726,611 | 2/1988 | Saver | 285/236 |
| 5,039,137 | 8/1991 | Cankovic et al. | 285/236 |
| 5,163,717 | 11/1992 | Wise | 285/236 |

FOREIGN PATENT DOCUMENTS

| | | | |
|---|---|---|---|
| 935465 | 10/1973 | Canada | 285/236 |
| 981723 | 1/1976 | Canada | 285/236 |

OTHER PUBLICATIONS

Cast Iron Soil Pipe Institute Designation 310-90, Specification for couplings for use in connection with hubless cast iron soil pipe and fittings, pp. 1-11 (date unknown).

*Primary Examiner*—Eric K. Nicholson
*Attorney, Agent, or Firm*—Allegretti & Witcoff, Ltd.

[57] ABSTRACT

A coupling for no-hub pipe segments has a shield covering an elastomeric gasket. The shield has a plurality on corrugations oriented transverse to the pipe axis and arranged in discrete areas. These corrugations are separated by corrugations oriented parallel to the pipe axis arranged in discrete areas. Clamping bands securely clamp the shield and gasket to the pipe segments. The pattern of corrugations permits the shield to assume a shouldered shape when the clamping bands are tightened and the coupling is installed on pipes of slightly varying diameter. The gasket is provided with a pattern of thick sealing sectors and adjacent groove sectors laterally spaced relative to thick sealing sectors. This pattern permits the clamping bands and shield to form a restriction impeding the movement of the shield relative to the gasket when the clamping bands are tightened.

14 Claims, 4 Drawing Sheets

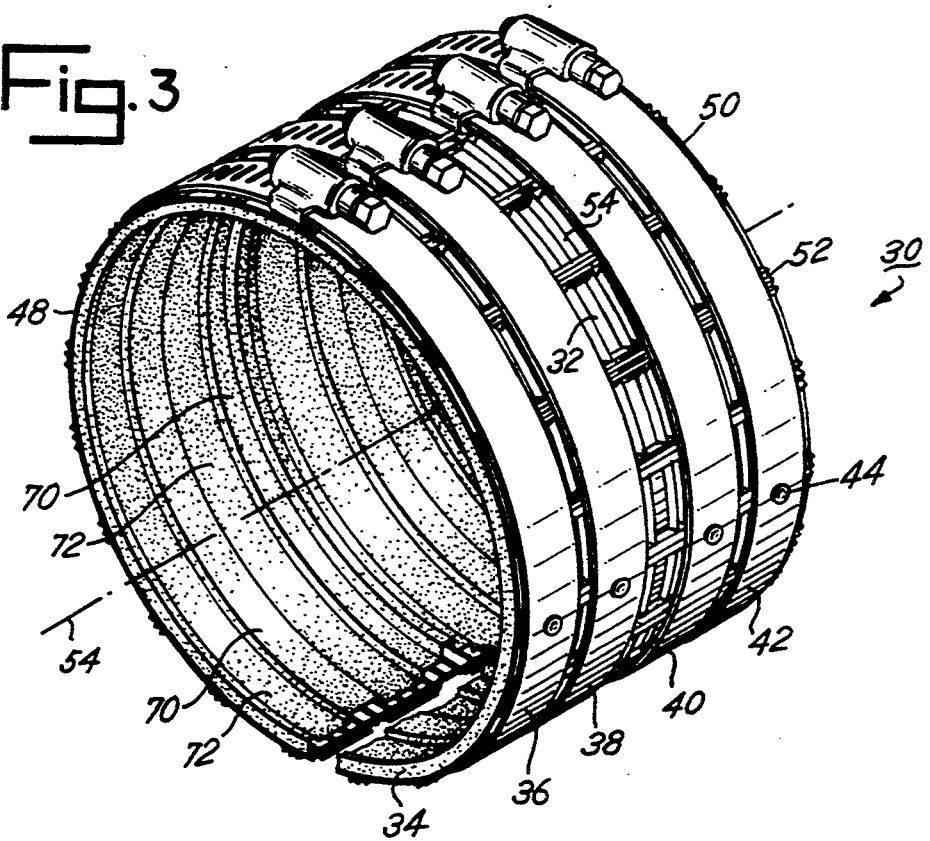
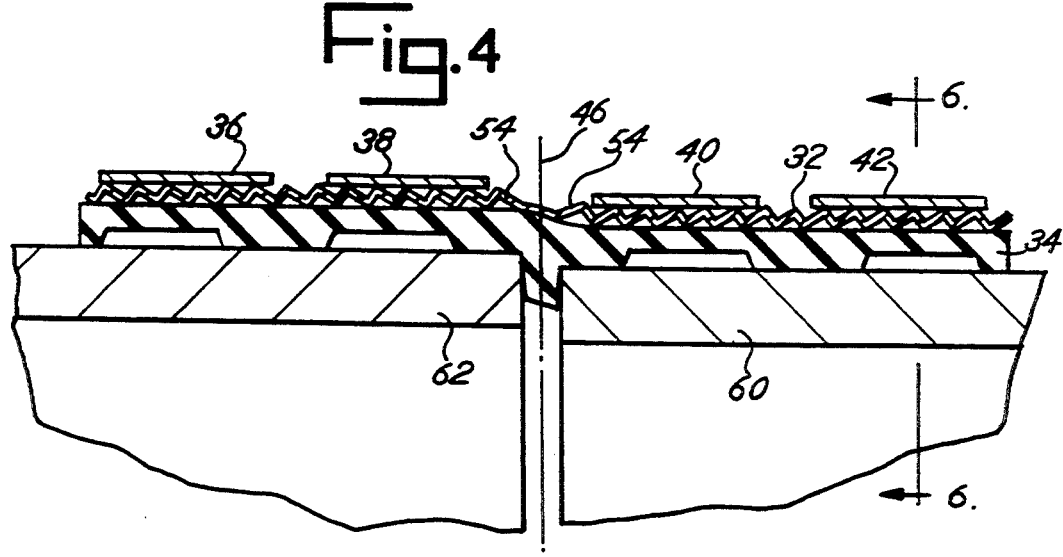

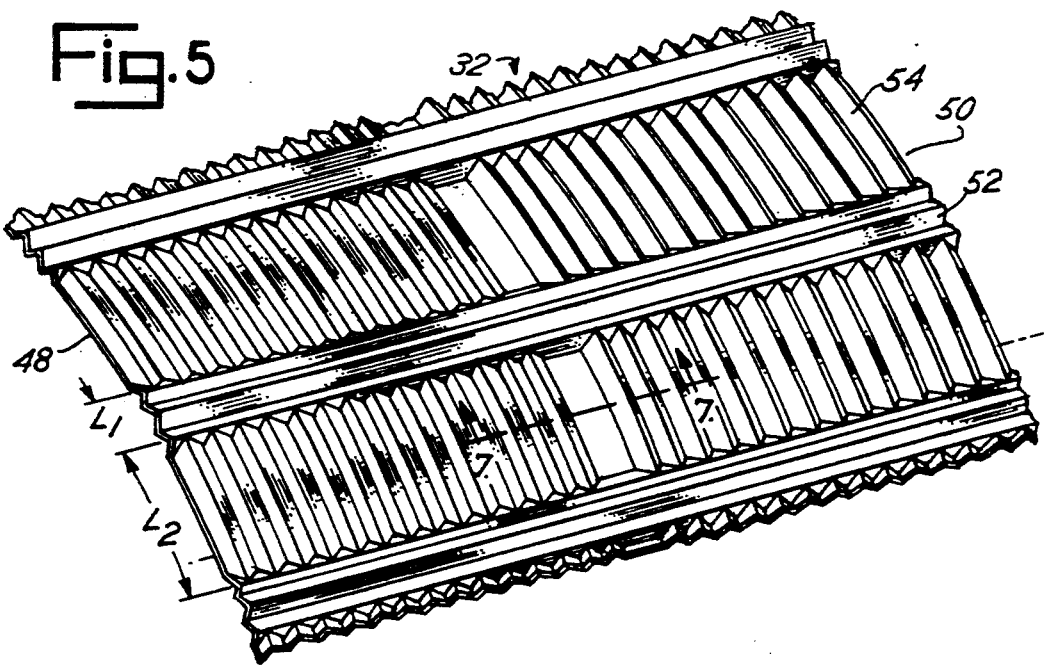
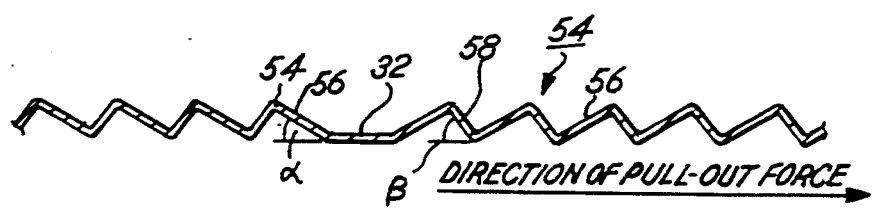
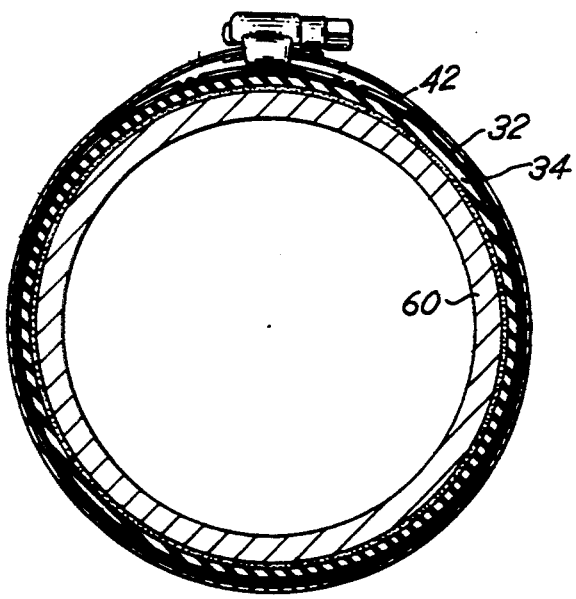

NO-HUB COUPLING

BACKGROUND OF THE INVENTION

A. Field of the Invention

This invention relates generally to the field of couplings for joining pipe segments together. The term "no-hub" in the context of couplings refers to pipe segments that have no spigots or other features at their ends. No-hub couplings are often used for coupling pipe segments in drain, waste and vent piping systems.

B. Discussion of Related Art and Improvements of the Invention

General background information on no-hub couplings is described in the Cast Iron Soil Pipe Institute standard No. 310-90. This standard describes a pipe coupling having a shield with a plurality of corrugations parallel to the axis of the pipe, two or four clamping bands covering the shield, and an elastomeric gasket covered by the shield which makes sealing contact with the pipe segments.

No-hub couplings were introduced into the United States in the early 1960's. An early patent describing a no-hub coupling is the patent to Evans, U.S. Pat. No. 3,233,922. The no-hub coupling described in the Evans patent suffers from a low resistance to pull-out forces. These pull-out forces occur under two situations: (1) an accidental stoppage in the system, or (2) an intentional stoppage produced once, at either the completion of construction, or by a plumbing inspector to verify freedom from leakage in the system.

In the early 1980's heavy-duty couplings were introduced to the market to improve the resistance to pull-out forces in the coupling. One of these couplings was produced by the Anaheim Foundry Company and is described in their patent, U.S. Pat. No. 4,564,220. Another heavy-duty coupling introduced in the 1980's was known as the "Tyler" pipe coupling from the Plessey Corporation, described in U.S. Pat. No. 4,538,839. Both of these heavy-duty coupling designs increase the strength of the coupling by adding additional bands, in addition to other changes. The standard no-hub couplings were made in sizes of 1½ inches, 2 inches, 3 inches, and 4 inches, with two clamp bands per coupling. The 5 inch, 6 inch, 8 inch and 10 inch sizes were made with four clamps per coupling. These new heavy duty couplings increase the number of clamps from 4 to 6, respectively.

The industry has established certain tests to be performed on pipe couplings in order to satisfy minimum industry requirements. These tests are the hydrostatic test, the deflection test, the shear test, and the thrust test. The most difficult of these tests to pass is the thrust test. Essentially, the thrust test is an unrestrained "pull-out" test. The thrust test is run by increasing the internal pressure in a water-filled pipe assembly, in timed, incremental steps. When the slippage of the pipe out of the coupling reaches 0.150 inches, the coupling is deemed to have failed. The thrust test standard is described in the Cast Iron Soil Pipe Institute Standard mentioned previously.

The thrust requires that one of the pipes be at a minimum permissible diameter and the other pipe at a maximum permissible diameter. The difference in the size of the pipes during the test is that, in practice, pipes are made to certain tolerances and some variation in the size of the pipes is inevitable. The bilateral tolerance between the two pipes is generally plus or minus 0.09 inches. Therefore, the diameter difference between the two pipe segments is up to 0.18 inches. The disparity in circumference between the maximum and minimum pipes is 0.57 inches. In order to pass the thrust test in these conditions, two things are required. First, the joint must not leak, and second, the rate at which the pipe moves out of the coupling must be minimized.

The above-described pipe couplings rely upon friction alone between the coupling gasket and the pipes to hold the pipes together and prevent pull-out of the pipe from the coupling. In these designs, the clamp bands, when tightened, press down on the shield. The shield, in turn, presses down on the gasket, which is then pressed against the pipe. Any interference with the transmission of the clamp pressure through the shield to the gasket and on to the pipe will result in diminished friction and hence a diminished resistance of a pipe from being pulled out from the coupling.

There are two sources of possible interferences which can result in pipe to coupling displacements, and hence leakage. These possible interferences are at the pipe-to-gasket interface and the gasket-to-shield interface. The inherently higher friction between the pipe and gasket generally prevents movement between these two components at the pipe-to-gasket interface. The displacement of the pipe relative to the coupling is largely caused by the relatively low friction between the smooth stainless steel shield and the gasket.

As mentioned previously, the above described prior art couplings rely on friction alone to hold the two pipes together. It has been discovered that certain inherent design deficiencies in the standard prior art no-hub couplings make these couplings inherently prone to failure of the thrust test, particularly due to the shape in which the shield is maintained when the pipes are clamped onto two different pipe segments of different diameters. The shape of the shield in prior art couplings tends to cause the coupling to suffer from pull-out failures. Moreover, it has been discovered that inherent limitations in the design of prior art coupling shields has promoted a wrinkling of the gasket when the shield is deformed to conform to the smaller diameter pipe size. This gasket wrinkling promotes leakage failures.

With regard to the above-described problem of wrinkling of the gasket which promotes leakage failures, the wrinkling occurs during the process of installing the coupling on to the pipe segments, particularly when one of the pipe segments is of a slightly smaller pipe diameter relative to the other pipe segment, e.g., 0.18 inch diameter difference for a six inch pipe. The wrinkling can become most severe if the two clamps on the larger pipe are tightened before the clamping bands on the smaller pipe segment are tightened. When the shield is clamped about the smaller diameter pipe segment, the shield itself must absorb the circumferential reduction, causing a wrinkling of the shield. If the wrinkling of the shield is distributed evenly throughout the circumference of the shield the coupling will typically not leak. However, if all or most of the wrinkling is localized, it produces a bunching up of the shield, and will result in leakage at either side of the wrinkle. This is illustrated in FIG. 1, which depicts a clamp band 10 clamping a shield 12 and gasket 14 on to a pipe segment 16. Region A is a region of only minor wrinkling, and region B is a region of pronounced wrinkling, and hence leakage in region C. Our invention substantially eliminates the bunching up of the shield, as shown in FIG. 1, by distributing the circumferential reduction in the shield evenly around the entire circumference of the shield.

In the coupling of the prior art Evan's '922 patent and the coupling shield described in the CISPI Standard mentioned previously, the shield corrugations are oriented parallel to the pipe axis. We have discovered that the properties of these corrugations relative to controlling the gasket wrinkling problem are poor. The corrugations are uninterrupted throughout the length of the shield. Therefore, there is no way of evenly distributing the wrinkles which are formed when the clamps are tightened to collapse the shield about a smaller diameter pipe. As mentioned before, this change in diameter requires approximately a 9/16 inch circumference reduction. That much reduction results in random, sometimes unacceptably large and localized wrinkles. These wrinkles produce low pressure regions on the gasket adjacent to the wrinkles, resulting in leakage. The corrugations in the coupling of the Evans '922 patent provide no mechanical impediment to gasket-to-shield movement. The friction at the gasket-to-shield interface is inherently low due to the smoothness of the steel shield surface.

In the configuration of the Evans '922 patent, the relatively flexible steel shield is stiffened considerably, particularly in the lateral direction. This stiffness is in such a direction so as to force the shield to take on an undesirable conical shape. The conical shape can be seen in FIGS. 2A and 2B, and the shouldered shape provided by our invention can be seen in FIG. 2C. In FIG. 2B, the pipe segment 16 has been shifted over such that the edge 20 of pipe segment 16 is flush with edge 22 of pipe segment 24, a situation which occurs in the field. The problem with the shield retaining the conical shape as shown in FIGS. 2A and 2B is that compressive forces on the gasket are minimized, decreasing the contact between the gasket and the pipe. The conical shape of the shield creates spaces in regions A, B, C, or D, in which little or no compressive force between the gasket and the pipe will exist. The resistance to pull-out is therefore limited to the friction produced by approximately one clamping band instead of two clamping bands. We have recognized this problem, and appreciated that if the shield is collapsed about both pipe segments, such as shown in FIG. 2C, the shield has a "shouldered" shape, and all of the band forces will be imposed directly on the gasket. That additional force will raise the friction and therefore the pull-out resistance.

The present invention, in recognizing and providing solutions to these problems, is a no-hub coupling which provides a minimum leakage under the thrust test, as well as insuring that a maximum clamping pressure is exerted on to the clamping bands to the gasket and pipe interface, thereby avoiding pull-out failures.

Accordingly, an object of the invention is to provide a no-hub coupling with improved sealing capabilities. Another object of the invention is to provide a no-hub coupling which increases the coupling's ability to resist pull-out forces and to maintain a tight and secure clamping and sealing of the coupling to the pipe segments.

SUMMARY OF THE INVENTION

These and other objects and advantages of the invention are provided in a coupling for connecting first and second pipe segments together. The pipe segments, when joined together define a pipe axis. The coupling comprises, in the preferred embodiment, a shield having corrugations oriented parallel to the pipe axis and arranged in a plurality of discrete parallel corrugation areas. The parallel corrugations are separated by corrugations oriented transverse to the pipe axis and arranged in discrete transverse corrugation areas separate from the parallel corrugation areas. The parallel and transverse corrugation areas cover the surface of this shield in an alternating pattern. The coupling further includes an elastomeric gasket covered by the shield and clamping bands for securely clamping the coupling to the first and second pipe segments. The transverse and parallel corrugations of the shield cooperate with the gasket to prevent the gasket from wrinkling by absorbing circumferential reduction in the shield when the clamping bands are tightened. Additionally, the transverse and parallel corrugations permit the shield to form a shouldered shape and thereby securely clamp the gasket to the pipe segments when the clamping bands are tightened.

In the preferred embodiment of the invention, the gasket is provided with a thick sealing sector circumferentially formed in the interior sealing surface having a width $W_1$ for making sealing contact with the first and second pipe segment. The clamping band of width $W_T$ has, relative to the gasket, a medial portion and a lateral portion. The thick sealing sector of the gasket is disposed below the medial portion of the clamping band. Further, a groove sector of width $W_2$ is circumferentially formed in the interior sealing surface of the gasket in a lateral orientation relative to the thick sealing segment. The grooved sector is disposed below the lateral portion of the clamping band. The clamping bands squeeze the shield and the grooved sector when the clamping band is tightened. The clamping band, the shield and the grooved sector cooperate to form a restriction hindering the movement of the thick sealing sector relative to the pipe segment when the clamping band is tightened, increasing the resistance of the coupling to pull-out forces and preventing movement of the pipe coupling relative to the pipe segment. Preferably, the gasket is dimensioned such that $W_2$ is greater than $W_1$.

BRIEF DESCRIPTION OF THE DRAWINGS

The presently preferred form of the invention is illustrated in the drawings, wherein like reference numerals refer to like elements in the various views, and wherein:

FIG. 3 is a perspective view of the no-hub coupling of the present invention;

FIG. 4 is a sectional view of the coupling of FIG. 3 joining first and second pipe segments together, showing the no-hub coupling assuming a shouldered shape to insure secure clamping of the gasket and shield to the pipe segment;

FIG. 5 is a perspective view of a portion of the shield of the coupling of FIG. 3, showing the preferred relationship between the spacing of the transverse and parallel corrugations;

FIG. 6 is a sectional view of the coupling and pipe elements of FIG. 4 along the line 6—6 of FIG. 4;

FIG. 7 is an fragmentary, enlarged, sectional view of the shield of FIG. 5 along the line 7—7 of FIG. 5, showing the saw-tooth design of the transverse corrugations;

DETAILED DESCRIPTION OF THE PREFERRED EMBODIMENT

Figure 8:
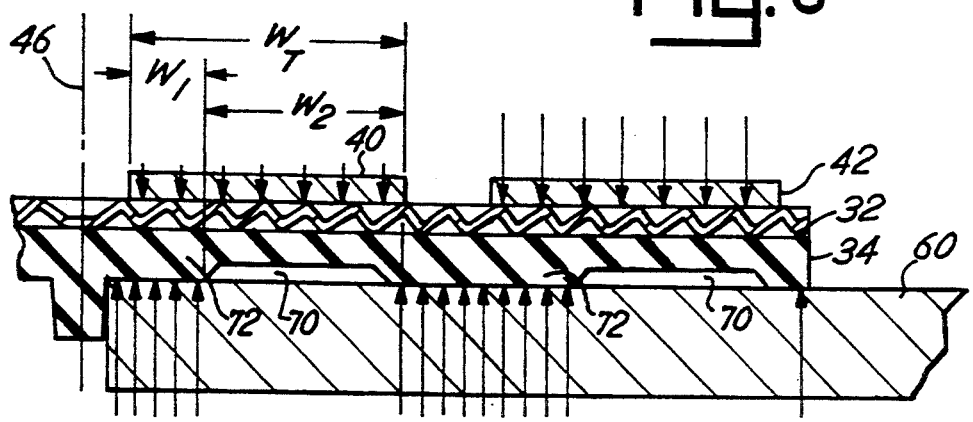
FIG. 8 is an enlarged, sectional view of the coupling and pipe section of FIG. 4 with the clamping bands untightened, showing the relationship between the width of the clamping bands and the width of the thick sealing and groove sectors of the gasket.

The preferred embodiment of our improved no-hub coupling 30 is illustrated in FIG. 3. The coupling 30 has a stainless steel shield 32 which covers an elastomeric gasket 34. The coupling is provided with conventional clamping bands 36, 38, 40, 42 which securely clamp the coupling 30 to first and second pipe segments (not shown in FIG. 3). The clamping bands 36, 38, 40, 42 are retained to the shield 32 by means of rivets 44 or other suitable fastening devices. The coupling of FIG. 3 satisfies the requirements of having the ability to reduce the circumference of the shield without causing excessive wrinkling of the gasket and the associated leakage. Additionally, the coupling provides the ability of the shield to assume a shouldered shape and thereby provide good compression of the gasket to the pipe segment. The coupling also provides for the ability to impede movement of the gasket relative to the shield, and thus increase the resistance to pull-out forces.

The coupling 30 of FIG. 3 is symmetrical about a plane 46 passing through the middle of coupling (as best seen in FIG. 4) and reference will be made herein to "medial" and "lateral" portions of the coupling. It will be understood that the term "medial" will refer to parts of the coupling 30 which are closer to the plane 46, while "lateral" will refer to portions of the coupling components which are closer to the nearest edge 48 or 50 of the coupling 30.

Referring to FIGS. 3 and 5, the shield 32 is provided with a intermittent corrugations to provide evenly-spaced circumferential reduction of the shield 32 and gasket 34 to accommodate pipe segments having varying diameters. A limited number of corrugations 52 are oriented in the direction parallel to the pipe axis 54 and arranged in discrete areas in numerous places along the length of the shield. Preferably, these corrugations 52 are of ¼ inch widths ($L_1$ in FIG. 5) with a 0.100 inch peak-to-peak spacing of the corrugations. The parallel corrugations 52 are located every ¾ inches ($L_2$ in FIG. 5) about the shield 32. The effect of these small sections of parallel corrugations 52 is that each corrugation absorbs a portion of the total circumferential contraction when the shield is installed upon pipe segments of varying diameters. The parallel intermittent corrugations 52 collapse in an accordion fashion about the smaller diameter pipe, and cannot come out of their are since they are too short and are adjoined by tangentially stiff sections of transverse corrugations 54.

Referring again to FIGS. 3 and 5, these numerous parallel corrugations 52 are separated by transverse corrugations 54 which are preferably ½ inch in length ($L_2$) in FIG. 5. These transverse corrugations 54 allow the shield to readily assume a shouldered shape and to impede gasket movement. The transverse corrugations 54 are oriented at right angles to the direction of motion of the pipe as it is being pulled out of the coupling 30.

Figure 9:
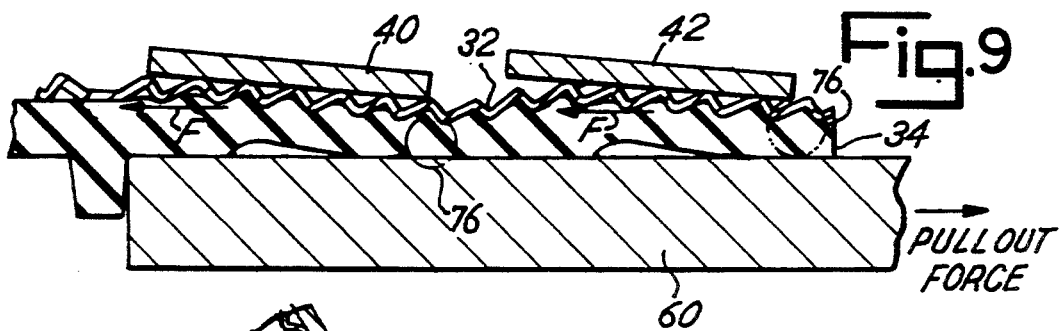
FIG. 9 is an enlarged, sectional view of the coupling and pipe segment of FIG. 8 with the clamping bands tightened, showing the cooperation of the shield, gasket and clamping bands to form a restriction, impeding the movement of the gasket relative to the pipe segment.

As a consequence of tightening of the clamps 36, 38, 40 and 42, the gasket 34 material is forced into the transverse corrugations 54, as shown in particular in FIG. 9. This forcing of the gasket rubber into the transverse corrugations 54 results in a mechanical "lock-up" and impedes the movement of the gasket 34 relative to the shield 32. To enhance this impedance to movement, the transverse corrugations 54 are provided with a saw tooth shape. Referring in particular to FIG. 7, the saw tooth shape of the transverse corrugations is such that the acute angle $\alpha$ formed by the medial portion 56 of the corrugation and the plane of the shield is less than the acute angle $\beta$ formed by the lateral edge 58 of the corrugation relative to the plane of the shield. In other words, the steeper sloping side of the corrugation is the lateral side of the corrugation.

Referring to FIG. 4, the transverse corrugations 54 permit the shield to assume a "shouldered" shape. This result is achieved because the corrugations 54 offer little or no resistance to bending over to accommodate the smaller diameter pipe 60 above the inherent resistance which exists in the stainless steel shield 32. This inherent resistance is relatively low and does not impede the ability of the shield 32 to assume a shouldered shape when the clamping bands 36, 38, 40 and 42 are tightened. Note that there are no gaps between the shield 32 and the gasket 34 or between the gasket 34 and the pipe segments 60 and 62.

The corrugations 54 oriented in the transverse direction also supply addition shield length due to their ability to stretch or straighten out. When the clamping bands 36, 38, 40 and 42 are tightened, they induce a tensile load in that portion of the shield 32 that lies between the two medial clamps 38 and 40. That is the location where the two different pipe segments 60 and 62 meet and the region where the shield must assume a "shouldered" shape to accommodate the smaller diameter pipe 60. The stretching or straightening out of the transverse corrugations 54 in this region provide some extra shield length to thereby produce the desired "shouldered" shape. Thus, as shown in FIG. 4, all four clamping bands 36, 38, 40 and 42 are able to fully apply compressive forces onto the gasket and pipe to securely clamp the coupling 30 to the pipe segments 60 and 62. The impedance to movements of the pipe segments relative to the gaskets 34 is increased as the two-thirds of the circumference of the shield having transverse corrugations 54 impedes the movement of the pipe due to the mechanical engagement of the rubber into the corrugations 54 when the clamp bands 36, 38, 40 and 42 are tightened.

Figure 1:
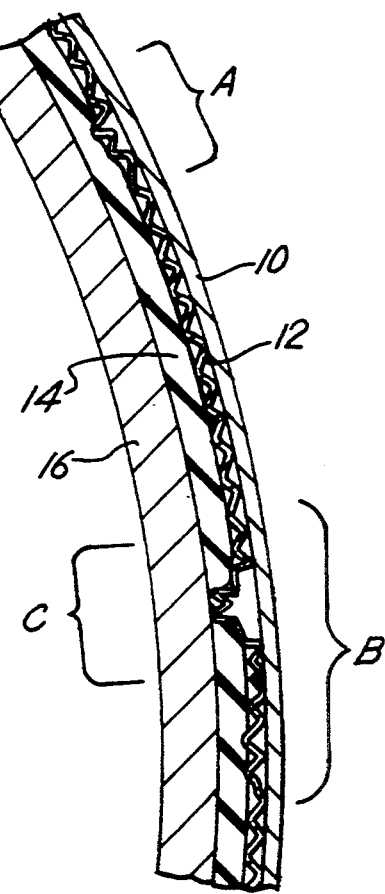
FIG. 1 is a fragmentary, sectional view of a prior art clamp band, shield, gasket and pipe segment, showing how undesirable wrinkles can be formed in prior art couplings.
Figure 2A:
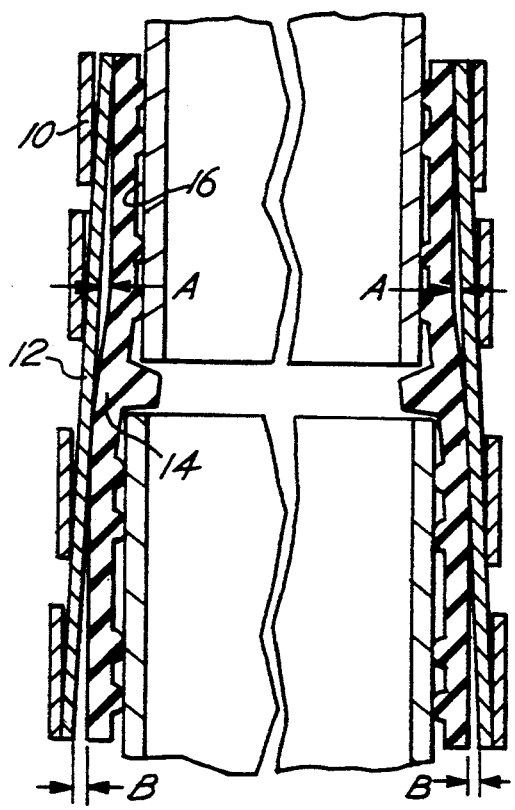
FIGS. 2A and 2B are sectional views of a prior art coupling connecting pipe segments of different diameters together, in which the shield for the coupling assumes a conical shape.
Figure 2B:
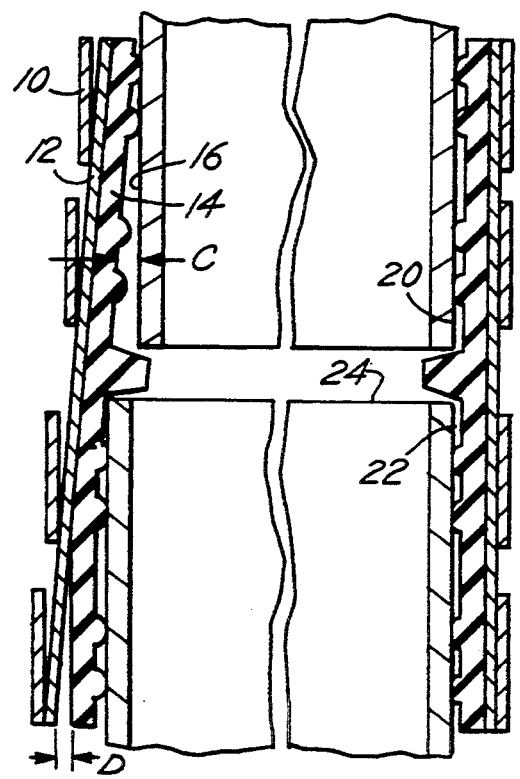
Figure 2C:
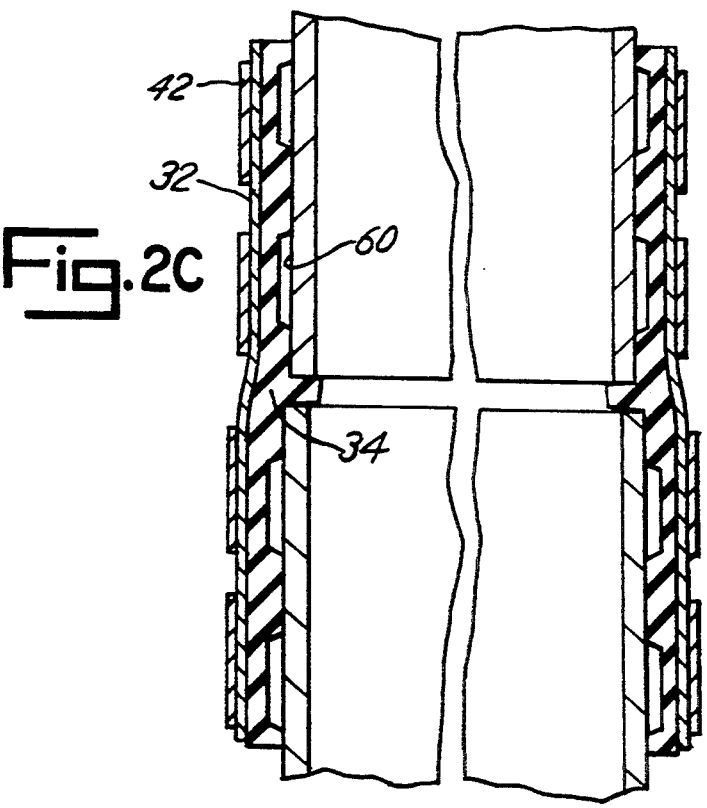
FIG. 2C is a sectional view of the coupling of our invention showing the shield assuming a shouldered shape.

Referring to FIGS. 3 and 5, we have also discovered that we can control and evenly distribute the wrinkling of the gasket by producing many short sections of parallel corrugations 52 separated by the lengths of transverse corrugations 54. The ½ inch lengths of transverse corrugations 54 cannot contribute to the wrinkling because they are stiff in the tangential direction. Thus, the gasket 34 is not prone to the pronounced wrinkling as shown in region B in FIG. 1.

Our coupling design also provides an improved gasket design which resist pull-out forces and prevents leaking. It has been discovered that the conventional gaskets, particularly those: described in the Evans '992 patent, offer poor resistance to pull-out forces. The gasket of the Evans '992 patent has a pair of sealing beads located centrally under each clamp band. The reason why these sealing beads provide a poor resistance to pull-out forces is that the usual manner of failure is a slippage between the gasket and the shield. This interface between the gasket and shield has a lower friction than the pipe-to-gasket interface. When the gasket begins to come out of the end of the shield, the thick rubber representing the beads is replaced with the thinner rubber that exists adjacent to the beads. This results in an unloading of the clamp, which, in turn, drops the radial pressure on the gasket and pipe segment and further diminishes the available friction. Referring to FIGS. 6, 8 and 9, in our design, as the gasket 34 is pulled out of the shield 32, the thickness of the rubber being pulled under the clamps 40 and 42 increases, thereby increasing the resistance to pull-out forces. Referring to FIG. 8, our gasket has a groove sector 70 of width (i.e., the dimension in the pipe axis direction as shown in FIG. 8, not the height or thickness of the gasket) $W_2$ under each band that is approximately $\frac{3}{4}$ of the width $W_T$ of the band. Adjacent to each groove 70 in the medial direction is a thick sealing sector 72 of width $W_1$ which is also disposed under the medial portion of the band. When the clamps are tightened as shown in FIG. 9, the clamps 40 and 42 squeeze the groove sector 70 into contact with the pipe segment 60, causing the clamp bands 40 and 42 to tilt slightly and form restriction areas 76. As the gasket 34 attempts to move out from under the shield 32 due to pull-out forces, the wedges of rubber formed at the thick sealing sector 72 of the gasket 34 are required to pass under the restriction areas 76 of the clamp bands. This produces an interference fit between the gasket 34 and shield 32, impeding the movement of the gasket 34 relative to the pipe 60 and shield 32.

Those of ordinary skill in the art will recognize that modifications can be made to the coupling described herein without departure from the true spirit and scope of the invention. For example, the components and dimensions described herein are dictated somewhat by the size of the coupling and the corresponding pipe segments, and the spacing of the transverse and parallel corrugation areas may be modified accordingly. This true spirit and scope of the invention is defined by the appended claims, to be interpreted in light of the foregoing specification.

We claim:

1. A coupling for connecting first and second pipe segments together, said pipe segments defining a pipe axis, comprising:
   a) a shield having:
      (i) corrugations oriented parallel to said pipe axis and arranged in a plurality of discrete parallel corrugation areas;
      (ii) said parallel corrugations separated by corrugations oriented transverse to said pipe axis and arranged in discrete transverse corrugation areas separate from said discrete parallel corrugation areas;
      (iii) said parallel and transverse corrugation areas covering the surface of said shield in an alternating pattern;
   b) an elastomeric gasket covered by said shield; and
   c) clamping bands securely clamping said coupling to said first and second pipe segments;
   d) said transverse and parallel corrugations of said shield cooperating with said gasket to absorb circumferential reduction in said shield and to permit said shield to securely clamp said gasket to said pipe segments when said clamping band are tightened.

2. The coupling of claim 1, wherein said transverse corrugations comprise saw-tooth corrugations having a lateral side and a medial side, and wherein the acute angle formed by said lateral side of said corrugation and the plane of said shield is greater than the acute angle formed by said medial side of said corrugation and the plane of said shield.

3. The coupling of claim 1, wherein the total surface area over said shield of all of said discrete transverse corrugation areas is greater than the total surface area over said shield of all of said discrete parallel corrugation areas.

4. The coupling of claim 3, wherein the total surface area over said shield of all of said discrete transverse corrugation areas is at least twice the total surface area over said shield of all of said discrete parallel corrugation areas.

5. The coupling of claim 1, wherein said discrete parallel corrugation areas are of equal area and the width $L_1$ of said discrete parallel corrugation areas is less than or equal to one-half the width $L_2$ of said discrete transverse corrugation areas.

6. The coupling of claim 1, wherein the width $L_1$ of said discrete parallel corrugations areas is less than one inch.

7. The coupling of claim 1, wherein at least one of said clamping bands has a medial portion and a lateral portion and wherein said gasket comprises:
   a thick sealing sector for making sealing contact with said first or said second pipe segment, said thick sealing sector having a portion thereof of dimension $W_1$ measured in the pipe axis direction disposed below said medial portion of said clamping band;
   a groove sector laterally placed relative to said thick sealing sector, said groove sector having a portion thereof of dimension $W_2$ measured in the pipe axis direction disposed below said lateral portion of said clamping band;
   said clamping bands squeezing said shield and said groove sector when said clamping band is tightened;
   said clamping band, shield and groove sector cooperating to form a restriction hindering the movement of said thick sealing sector relative to said first or said second pipe segment when said clamping band is tightened.

8. The coupling of claim 7, wherein said dimension $W_2$ is greater than said dimension $W_1$.

9. The coupling of claim 7, wherein said dimension $W_2$ is approximately three times said dimension $W_1$.

10. The coupling of claim 7, wherein said groove sector of said gasket is squeezed into a sealing contact with said first or said second pipe segment when said clamping band is tightened.

11. A coupling for connecting first and second pipe segments together, said pipe segments defining a pipe axis comprising:

a) a shield, said shield bisected by a plane passing through said shield in a direction transverse to said pipe axis;
b) first and second clamping bands surrounding said shield, said first and second bands located on said shield on opposite sides of said plane, respectively, each of said clamping bands having a medial portion and a lateral portion; and
c) an elastomeric gasket covered by said shield comprising:

a thick sealing sector circumferentially formed in said gasket for making sealing contact with said first or said second pipe segment, said thick sealing sector having a portion thereof of dimension $W_1$ measured in the pipe axis direction disposed below said medial portion of said first clamping band;

a groove sector adjacent to, and in a lateral orientation relative to said thick sealing sector, said groove sector having a portion thereof of dimension $W_2$ measured in the pipe axis direction disposed below said lateral portion of said first clamping band;

said first clamping band squeezing said shield and said groove sector into sealing contact with said first or second pipe segment when said first clamping band is tightened;

said first clamping band, shield and groove sector cooperating to form a restriction area hindering the movement of said thick sealing sector relative to said first or said second pipe segment when said clamping band is tightened.

12. The coupling of claim 10, wherein said dimension $W_2$ is greater than said dimension $W_1$.

13. The coupling of claim 10, wherein said dimension $W_2$ is approximately three times said dimension $W_1$.

14. The coupling as claimed in claim 11, wherein said coupling comprises four clamping bands, each of said clamping bands having a medial portion and a lateral portion, and wherein said gasket comprises four thick sealing sectors circumferentially formed in said gasket, each of said four thick sealing sectors positioned below said medial portions of said four clamping bands, respectively, and wherein said gasket further comprises four groove sectors each positioned adjacent to, and in a lateral orientation relative to, each of said four thick sealing sectors, respectively, each of said groove sectors disposed below said lateral portion of said four clamping bands, respectively.

* * * * *